(12) United States Patent
Lee et al.

(10) Patent No.: US 8,995,756 B2
(45) Date of Patent: Mar. 31, 2015

(54) 3D VISION PROCESSING

(71) Applicant: VanGogh Imaging, Inc., McLean, VA (US)

(72) Inventors: Ken Lee, Fairfax, VA (US); Xin Hou, Fall Church, VA (US); Jun Yin, McLean, VA (US)

(73) Assignee: VanGogh Imaging, Inc., McLean, VA (US)

( * ) Notice: Subject to any disclaimer, the term of this patent is extended or adjusted under 35 U.S.C. 154(b) by 55 days.

(21) Appl. No.: 14/039,807

(22) Filed: Sep. 27, 2013

(65) Prior Publication Data

US 2014/0086478 A1 Mar. 27, 2014

Related U.S. Application Data

(60) Provisional application No. 61/706,457, filed on Sep. 27, 2012.

(51) Int. Cl.
*G06K 9/36* (2006.01)
*G06K 9/00* (2006.01)

(52) U.S. Cl.
CPC .............. *G06K 9/36* (2013.01); *G06K 9/00214* (2013.01); *G06K 9/00973* (2013.01)
USPC ........... 382/154; 382/107; 382/103; 600/104; 600/130

(58) Field of Classification Search
CPC .................. G06T 7/0075; G06T 2207/10012; G06T 2207/10016; G06T 7/2033; G06T 7/20; G06K 9/00771

USPC .......................................... 382/154, 103, 107
See application file for complete search history.

(56) References Cited

U.S. PATENT DOCUMENTS

| 2007/0075997 | A1 | 4/2007 | Rohaly et al. |
| 2010/0209013 | A1 | 8/2010 | Minear et al. |
| 2012/0056800 | A1 | 3/2012 | Williams et al. |
| 2012/0063672 | A1 | 3/2012 | Gordon et al. |
| 2012/0130762 | A1 | 5/2012 | Gale et al. |
| 2013/0123801 | A1* | 5/2013 | Umasuthan et al. .......... 606/130 |

OTHER PUBLICATIONS (C1) International Search Report and Written Opinion from corresponding PCT patent application No. PCT/US2013/062292, dated Jan. 28, 2014, 10 pages.

* cited by examiner

*Primary Examiner* — Ruiping Li
(74) *Attorney, Agent, or Firm* — Proskauer Rose LLP

(57) ABSTRACT

Methods and apparatuses are described for processing 3D vision algorithms. A 3D vision processor device comprises one or more 3D vision processing cores. Each 3D vision processing core includes one or more memory blocks for storing location values associated with 3D point cloud images and an arithmetic logic unit coupled to the one or more memory modules. The arithmetic logic unit includes a plurality of memory registers for temporarily storing location values associated with a point in a 3D point cloud image and a processing unit coupled to the plurality of memory registers for performing arithmetic operations on the location values stored in the memory registers, the arithmetic operations used for 3D vision processing algorithms. The 3D vision processing core also includes a communication link for transferring data between the arithmetic logic unit and the memory modules.

21 Claims, 6 Drawing Sheets

3D VISION PROCESSING

RELATED APPLICATIONS

This application claims priority to U.S. Provisional Patent Application No. 61/706,457, filed Sep. 27, 2012, the entirety of which is hereby incorporated by reference.

FIELD OF THE INVENTION

The subject matter of this application relates generally to methods and apparatuses, including computer program products, for three-dimensional (3D) vision processing.

BACKGROUND

Vision processing has traditionally been done using a central processing unit (CPU), a graphics processing unit (GPU), or combination of both units as integrated into a computing device, such as a personal computer or server computing device. In some cases, a field-programmable gate array (FPGA) has been used in conjunction with the CPU and/or GPU to assist with the vision processing, especially when the processing is only needed for a short timeframe. Some specific processing functions such as red-eye removal or color correction processing have been made into a custom image processing unit but such units are typically limited to one or two specific functions.

A traditional solution is for a camera to capture image data and transmit the data to vision processing software (e.g., OpenCV) stored on a computing device (e.g., computer). The vision processing software performs certain vision processing algorithms (e.g., Canny edge detection algorithm) on the data through use of a CPU/GPU in the computer.

These traditional approaches have worked fairly well for two-dimensional (2D) processing. However, with new vision processing applications such as augmented reality, measurement, and gesture recognition that can work with popular 3D sensors, e.g., from PrimeSense or Leap Motion, there is a need for 3D processing in real-time—which has not been realized in a satisfactory manner by traditional platforms.

As an example, MICROSOFT® KINECT®, available from Microsoft Corp. of Redmond, Wash., or similar motion sensing input and image capture devices use a custom hardware chip, programmed with specific vision processing algorithms, in order to process 3D data in real-time. Without such silicon-based algorithm processing, it would not be possible to provide real-time 3D processing which can then be used in a large number of applications.

The problem becomes even more acute when trying to implement vision processing applications in mobile or embedded devices, such as smart phones, tablet computers, small Linux devices, and the like. Generally, these devices have limited battery life, processing capability, and memory capacity. Hence, it is not practical to expect mobile and embedded devices to be able to process 3D vision algorithms in any satisfactory manner when real-time processing is required.

For example, power consumption is high for vision processing because most vision processing algorithms and processing units are computing intensive and use a lot of megaflops for the algorithm processing. Also, a lot of memory is needed to store data for vision processing, especially if the data is coming directly from a camera and is getting stored in the system memory. Raw data stream from such camera(s) can be as much as 200 Mbits/sec when converted to 3D data points. Further, most of these devices have processor cores based on the ARM architecture (e.g., developed by ARM Holdings, plc of Cambridge, England)—or something similar—which have a fraction of the processing capability of, e.g., high-end processors available from Intel Corp. of Santa Clara, Calif. that are used in laptops and desktops. However, high-end CPU processors lead to high power consumption, and shorten the battery life in mobile or embedded devices.

SUMMARY OF THE INVENTION

Therefore, what is needed is a 3D Vision Processor Unit (3VPU), a silicon device or core, that is coupled between a camera and a System on a Chip (SoC) used in mobile or embedded devices, where the 3VPU pre-processes data for most of the vision processing needs of the mobile or embedded device. As it is difficult to put all possible vision processing algorithms onto a single chip using custom circuits, the architecture and functionality of the 3VPU includes selecting commonly-used computational equations that are used in vision processing and building those equations into the 3VPU hardware as standard core blocks that can be programmed. The 3VPU is then easily complemented by a software driver for the CPU/GPU/SoC to perform specific functions using the same hardware blocks. The application software thus does not have to know the details of how the algorithm is implemented but can command the driver to perform functions such as ICP (Iterative Closest Point) or decimation functions. The balance between software and silicon hardware implementation is important to ensure that the overall vision processing methods and algorithms take advantage of both platforms. The software generally handles the higher-level algorithm workflow, while the silicon hardware handles the speed-critical, heavy-duty processing. The selection of the computational capability of the 3VPU is most important in this respect. The functions of these computational capabilities are described herein.

The architecture and implementation of the 3VPU described herein has several advantages over traditional approaches involving the CPU/GPU as described above:
  Power consumption and cost: Because the algorithm is implemented efficiently in hardware, there is minimal waste—both in terms of amount of silicon used (which translates to cost) and power consumption.
  Flexibility: Since the set of functions programmed into the 3VPU are those most commonly used in vision processing algorithms, many different applications can take advantage of the 3VPU's hardware functionality to make the algorithm run faster.
  Less memory: Because the camera input directly interfaces with the 3VPU, the data is pre-processed by the algorithms programmed into the 3VPU and only the processed data is sent to the main memory of the SoC for further processing. Of course, data can also be transmitted from the main memory to the 3VPU for further processing. Either way, the 3VPU can quickly cut down the amount of raw data into a manageable dataset that is a fraction of the original data.
  Performance: The 3VPU can process the vision processing algorithms quickly using silicon hardware (as compared to the previous software approaches) that algorithm robustness no longer needs to be sacrificed. This improves the system's overall reliability and accuracy.

3D processing functions are typically matrix-based and applied to a multi-dimensional data set. Therefore, simple arithmetic operations and memory structures currently available both in the CPU and GPU do a poor job in executing most 3D processing algorithms. The systems and techniques described herein use a structured, matrix-based arithmetic logic unit (ALU) which is orders of magnitude faster than a traditional ALU. The inventive approach also has a unique memory architecture that can accommodate datasets typically found in 3D processing algorithms so that the data flow between the memory and the ALU and within the ALU is very efficient.

The invention, in one aspect, features a 3D vision processor device for processing 3D vision algorithms. The 3D vision processor device comprises one or more 3D vision processing cores. Each 3D vision processing core includes one or more memory blocks for storing location values associated with 3D point cloud images and an arithmetic logic unit coupled to the one or more memory modules. The arithmetic logic unit includes a plurality of memory registers for temporarily storing location values associated with a point in a 3D point cloud image and a processing unit coupled to the plurality of memory registers for performing arithmetic operations on the location values stored in the memory registers, the arithmetic operations used for 3D vision processing algorithms. The 3D vision processing core also includes a communication link for transferring data between the arithmetic logic unit and the memory modules.

The invention, in another aspect, features an arithmetic logic processor for processing 3D vision algorithms. The arithmetic logic processor includes a plurality of memory registers for temporarily storing location values associated with a point in a 3D point cloud image and a processing unit coupled to each of the plurality of memory registers via a separate bus, the processing unit comprising a plurality of arithmetic operation layers for performing 3D vision processing arithmetic operations on the location values stored in the memory registers.

The invention, in another aspect, features a computerized method for processing 3D vision algorithms. 3D point cloud data representative of a physical object is received from an imaging device. Location values associated with points in the 3D point cloud data are stored in one or more memory blocks of a 3D vision processing core. An arithmetic logic unit coupled to the one or more memory blocks retrieves the location values associated with a point in the 3D point cloud data and temporarily stores the location values in a plurality of memory registers. A processing unit coupled to the plurality of memory registers executes one or more arithmetic operations on the location values stored in the memory registers, where the arithmetic operations are used for 3D vision processing algorithms. The processing unit transmits a result of the one or more arithmetic operations to a central processing unit.

Any of the above aspects can include one or more of the following features. In some embodiments, the location values associated with 3D point cloud images are x-axis, y-axis and z-axis values. In some embodiments, each of the plurality of memory registers is independently coupled to the processing unit and independently coupled to the one or more memory blocks. In some embodiments, each of the plurality of memory registers retrieves location values from the one or more memory blocks in a single bus cycle.

In some embodiments, each of the plurality of memory registers is partitioned into three sections, and each of the three sections is associated with one of the location values. In some embodiments, the processing unit of the arithmetic logic unit is comprised of two arithmetic processing layers. In some embodiments, the first arithmetic processing layer performs the arithmetic operations of addition, subtraction, multiplication, and division, and the second arithmetic processing layer performs the arithmetic operation of summation.

In some embodiments, the first arithmetic processing layer comprises a plurality of arithmetic logic modules, each coupled to one or more of the plurality of memory registers. In some embodiments, the 3D vision processor device includes an imaging device coupled to the 3D vision processor device, the imaging device capturing and transmitting images to the 3D vision processor device for analysis. In some embodiments, the 3D vision processor device is embedded in a mobile or embedded computing device.

In some embodiments, the location values associated with 3D point cloud images stored in the one or more memory blocks represent one or more voxels of the 3D point cloud images. In some embodiments, the processing unit of the arithmetic logic unit accesses two or more of the memory registers simultaneously and performs arithmetic operations on the location values stored in the memory registers in parallel. In some embodiments, the one or more memory registers include a shift command operable to exchange location values within the memory register.

In some embodiments, the one or more 3D vision processing cores receive 3D point cloud data from an external source independently of the other 3D vision processing cores and convert the received 3D point cloud data into one or more voxels for storage in the one or more memory blocks and processing by the arithmetic logic unit. In some embodiments, the one or more 3D vision processing cores are coupled together via a communication link and the one or more 3D vision processing cores exchange 3D point cloud data. In some embodiments, one or more vision processing algorithms are programmed into the 3D vision processor device. In some embodiments, the 3D vision processor device includes an interface to software-based vision processing algorithms, where the device accesses the software-based vision processing algorithms to alter the arithmetic operations performed by the one or more 3D vision processing cores.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
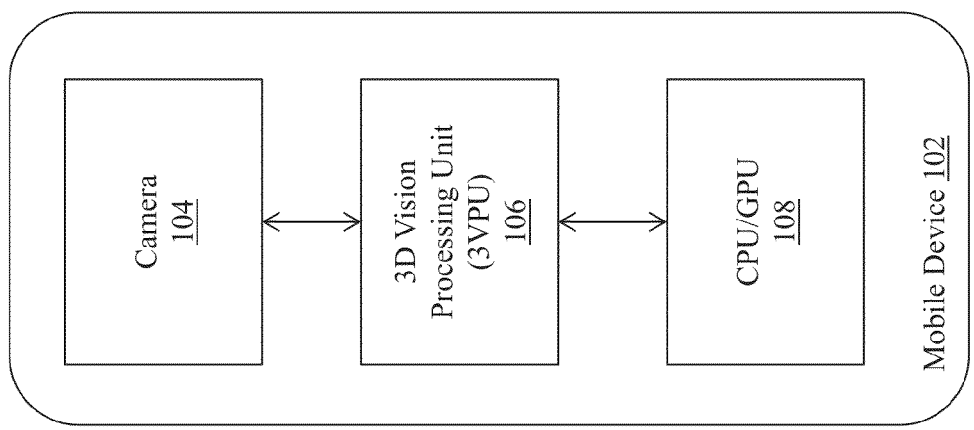
FIG. 1 is a block diagram of a system for 3D vision processing, according to an embodiment of the invention.

FIG. 1 is a block diagram of a system 100 for 3D vision processing, according to an embodiment of the invention. The system 100 includes a mobile computing device 102. Exemplary mobile computing devices take on many forms, including but not limited to a laptop computer, a tablet computer, a smart phone, an internet appliance, or the like. Although FIG. 1 depicts a mobile computing device 102, it should be appreciated that other computing devices (e.g., an embedded system or desktop computer) can be used without departing from the scope of the invention. The mobile computing device 102 includes network-interface components to connect to a communications network. In some embodiments, the network-interface components include components to connect to a wireless network, such as a Wi-Fi or cellular network, in order to access a wider network, such as the Internet. The mobile device 102 includes a camera 104 used for capturing images, a 3D Vision Processing Unit (3VPU) 106, and a CPU/GPU module 108.

Figure 2:
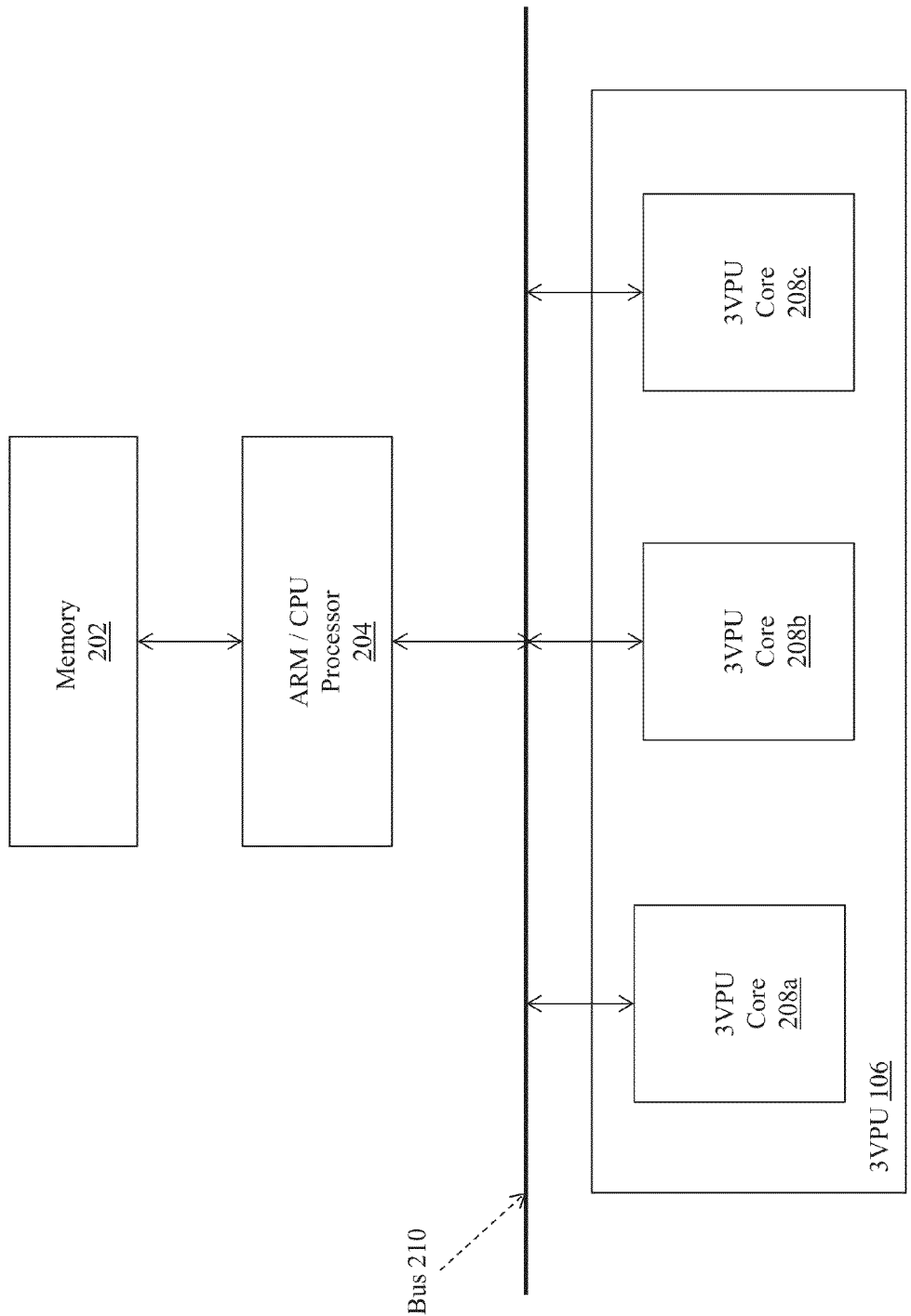
FIG. 2 is a block diagram of the 3VPU architecture, according to an embodiment of the invention.

FIG. 2 is a block diagram 200 of the 3VPU architecture, according to an embodiment of the invention. The 3VPU 106 includes a plurality of 3VPU Cores 208a-208c. In some embodiments, there are a large number of 3VPU Cores in a 3VPU, allowing the 3VPU to process the data set in parallel. In some embodiments, only one 3VPU Core is used. However, the 3VPU typically does not need thousands of 3VPU Cores in order to efficiently execute 3D processing algorithms. In some embodiments, tens or hundreds of 3VPU Cores are able to perform similar processing algorithms and functions as GPUs using thousands of parallel processing units, but consume less power and cost significantly less—resulting in a much more favorable power-to-cost ratio than traditional GPUs. The ARM/CPU 204 is used to partition the dataset retrieved from memory 202 and distribute the dataset to each 3VPU Core 208a-208c via the bus 210 for parallel processing.

Figure 3:
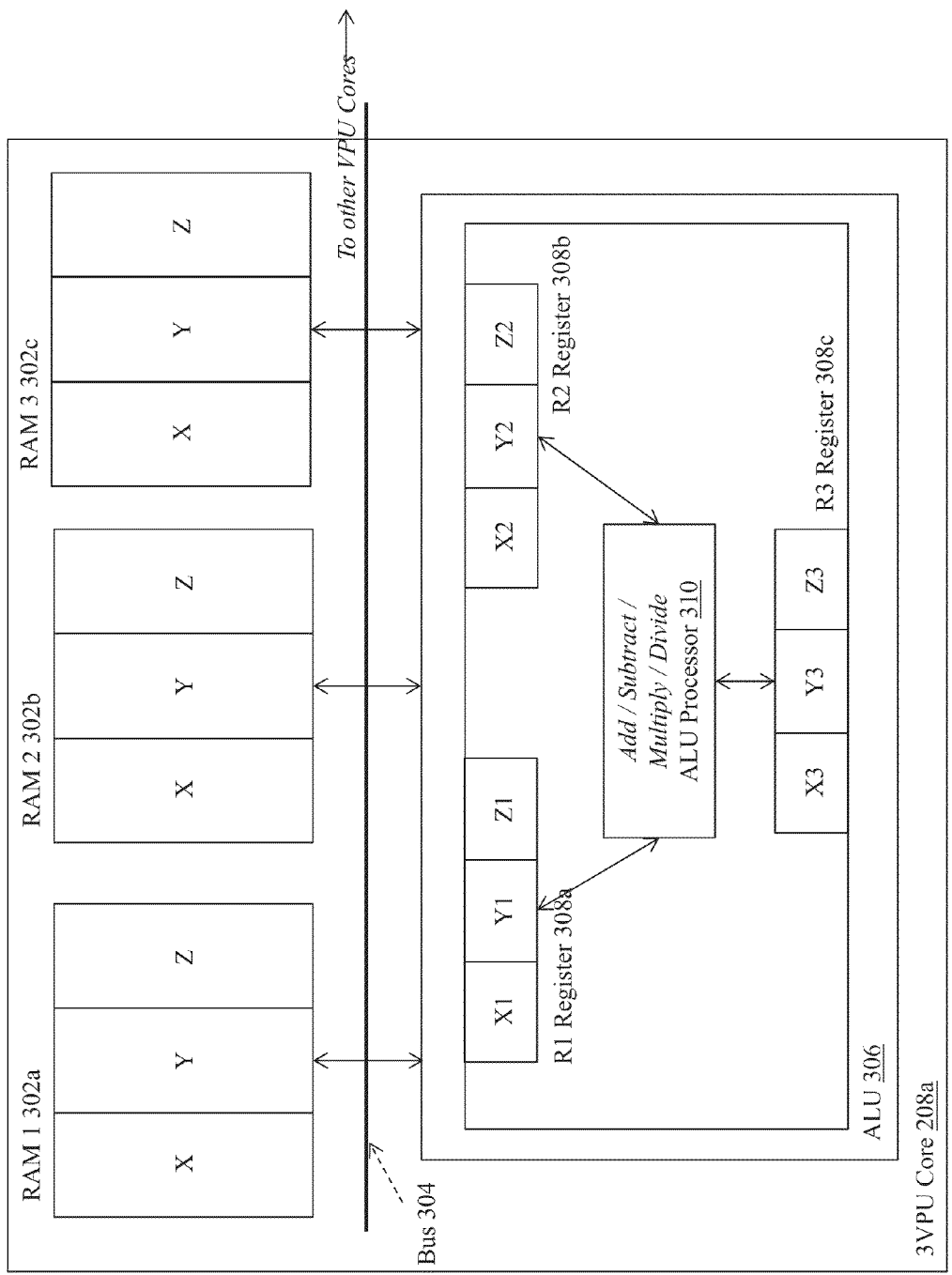
FIG. 3 is a block diagram of a 3VPU Core, according to an embodiment of the invention.

FIG. 3 is a block diagram of a 3VPU Core (e.g., Core 208a of FIG. 2), according to an embodiment of the invention. The 3VPU Core (e.g., Core 208a) comprises one or more Random Access Memory (RAM) blocks 302a-302c, a data bus 304 for transmitting data between 3VPU Cores, and an arithmetic logic unit (ALU) 306. The RAM blocks 302a-302c are typically mid-size, anywhere from tens to hundreds of bytes. While FIG. 3 depicts three RAM blocks 302a-302c, it should be appreciated that any number of RAM blocks can be used without departing from the scope of the invention. In some embodiments, the 3VPU Core 208a can include one large RAM block. Each RAM block 302-302c is structured into three sections (e.g., X, Y and Z as shown) to store and retrieve all three point coordinate values of (x,y,z) in a single bus cycle. Each section has an independent bus to the ALU allowing all three values (x,y,z) to be transferred to the ALU registers 308a-308c simultaneously. Further, the RAM blocks 302a-302c are connected to other 3VPU Cores (e.g., Cores 208b, 208c) via indirect memory access—allowing for transfer of data sets from one 3VPU Core to another 3VPU Core internal to the 3VPU without using external memory access.

The memory architecture for traditional methods for 2D/3D processing is either a flat one memory array or two memory arrays. For 3D processing, three memory arrays are needed, e.g., an X, Y, and Z memory structure that is accessible simultaneously. As shown in FIG. 3, multiple RAM blocks are available for each 3VPU Core to allow for loading and unloading of the multiple (x,y,z) values to and from the ALU in parallel.

The 3VPU Core 208a shown in FIG. 3 also includes a plurality of memory registers (R1 Register 308a, R2 Register 308b and R3 Register 308c), each coupled to an ALU Processor 310. Although FIG. 3 depicts three registers, it should be understood that the 3VPU Core 208a can include any number of registers. In some embodiments, the 3VPU Core 208a includes more registers in order to process functions like the cross-covariance matrix or the translation vector, as described in more detail below. The Registers 308a-308c are organized with three sections (X, Y, Z) which complements the needs of 3D processing, as described below.

Typical 3D processing takes two sets of 3D points and processes them against each other. As an example, a typical 3D processing operation involves taking a data set of a 3D point cloud and comparing the data set against another data set of a different 3D point cloud. The memory structure of the Registers 308a-308c in the 3VPU Core 208a allows access to both data sets of the 3D point clouds (i.e., two sets of x, y, z coordinates) easily and efficiently. Hence, Register R1 (X1, Y1, Z1) is loaded into the ALU at the same time as Register R2(X2, Y2, Z2) is loaded into the ALU because the Registers are independently coupled to the ALU Processor 310.

In addition, a Shift function within the Registers 308a-308c allows the values within each Register to be interchanged easily and efficiently. For example, a y-value can be moved to where an x-value is currently located, and vice versa. Therefore, the ALU 306 is capable of performing a matrix operation internally without re-loading the values from an external memory (e.g., RAM blocks 302a-302c).

Figure 4:
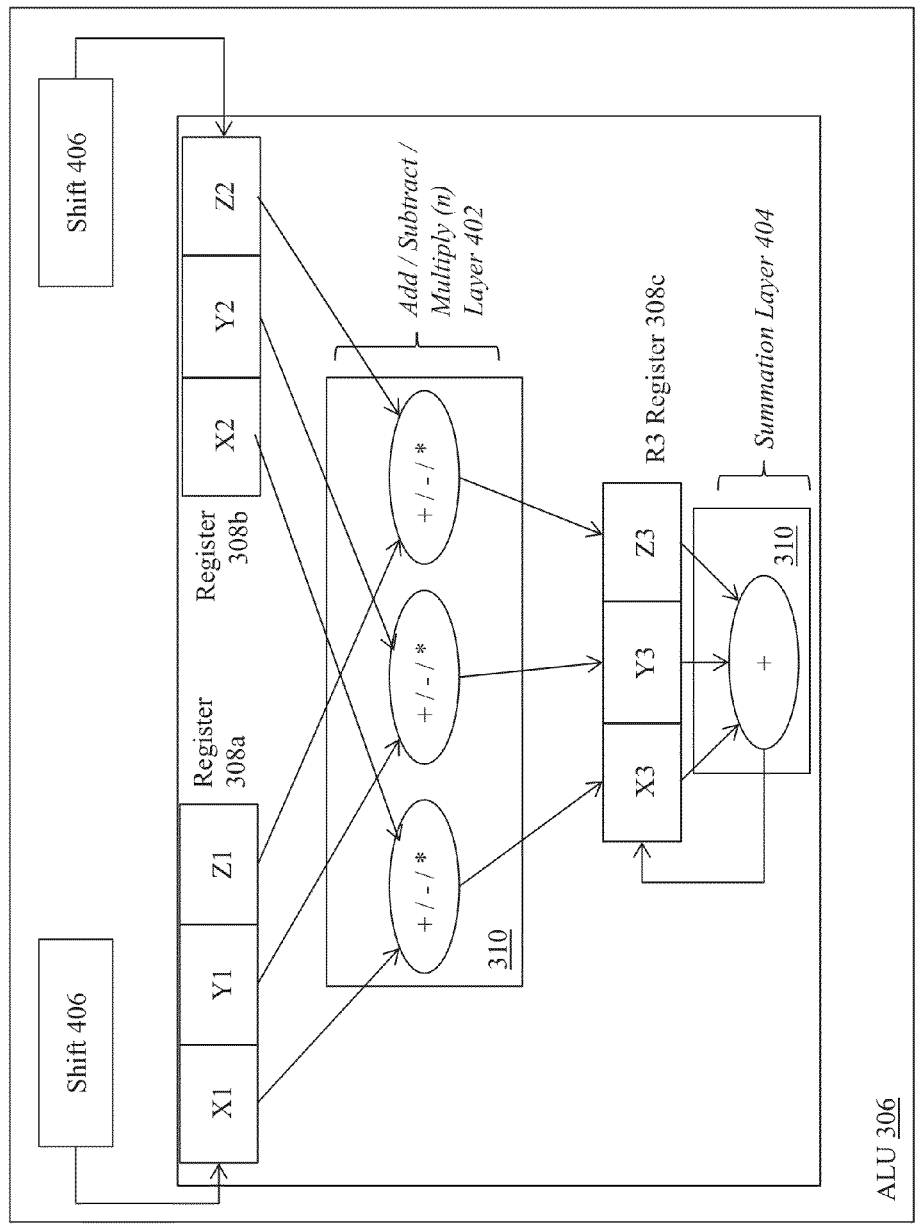
FIG. 4 is a detailed block diagram of the ALU, according to an embodiment of the invention.

FIG. 4 is a detailed block diagram of the ALU 306, according to an embodiment of the invention. The ALU 306 consists of ALU Registers 308a-308c and an ALU Processor 310 having layers with the following characteristics.

As shown in FIG. 4, the ALU 306 contains three Registers 308a-308c and two computational processing layers, the Add/Subtract/Multiply (n) layer 402 and the Summation layer 404. Other embodiments can use additional Registers and layers but the ALU architecture remains optimized for matrix operations.

All three registers, R1 308a, R2 308b, and R3 308c have direct access to the RAM blocks 302a-302c shown in FIG. 3. Registers 308a and 308b have a Shift function 406 where x, y, and z can be interchanged within the Registers 308a and 308b. Such an interchange is critical for certain types of matrix operations. For example, a single Shift command on Register 308b changes the values in Register 308b to be (Y2, Z2, X2) instead of the original configuration of (X2, Y2, Z2).

Registers R1 308a & R2 308b provide the input to the Add/Subtract/Multiply (n) layer 402 with the result from the Add/Subtract/Multiply (n) layer 402 going into Register R3 308c. It should be appreciated that the values of any of the Registers 308a-308c can be directly transferred to any of the other Registers. For example, Register R1 308a can be transferred to Register R3 308c, or Register R3 308c R3 can be transferred to Register R2 308b.

As shown in FIG. 4, the Add/Subtract/Multiply (n) layer 402 has three separate processing units for adding/subtracting/multiplication of x, y, z values contained in the Registers 308a and 308b. As a result, all three values of (x,y,z) are available to be processed in parallel by the ALU Processor 310. It should be appreciated that additional add/subtract/multiply processing units can be used without departing from the scope of the invention, to provide the benefit of additional parallel processing capability.

The Summation layer 404 retrieves x, y, z values only from Register R3 308c. The Summation layer 404 sums the values of Register R3 308c (e.g., X3, Y3, Z3), which is a common computation in a matrix operation. It should be appreciated that additional results registers can be added to the ALU 306 without departing from the scope of the invention, to provide the benefit of obviating a need to transfer data to a RAM block for temporary storage.

Another important facet of 3D processing realized by the systems and techniques described herein is structuring of the data to take advantage of the 3VPU architecture. In order to parallelize the processing of a large 3D point cloud, the data structure for the 3D point cloud should be grouped together into logical bins so that a large number of 3D processing units can process the dataset in parallel for maximum processing speed.

Figure 5:
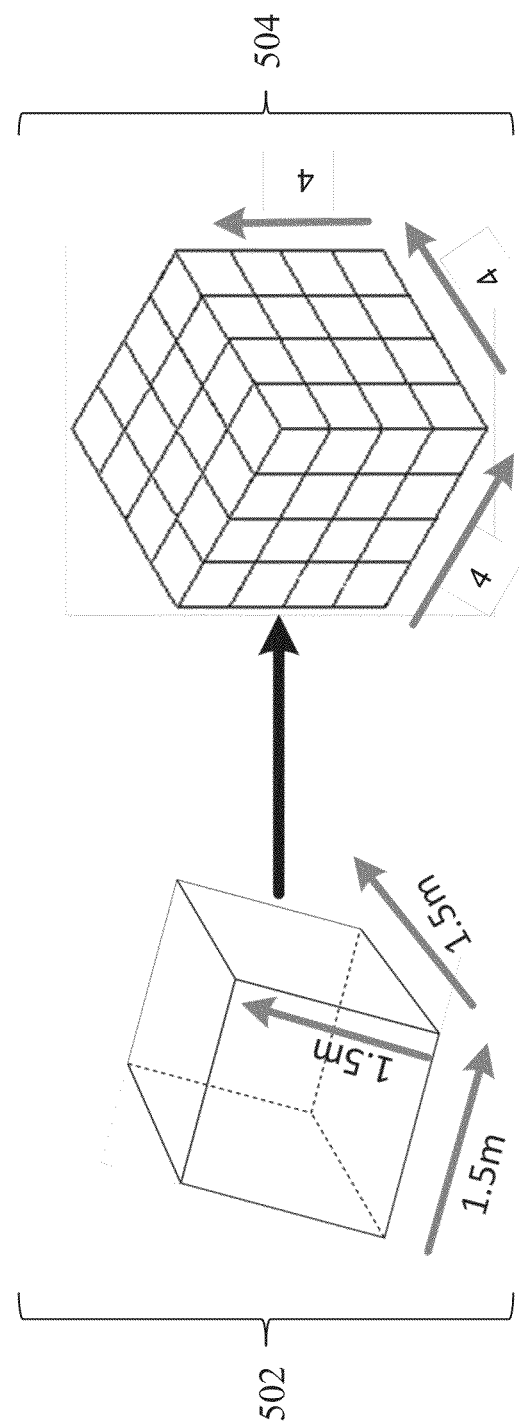
FIG. 5 is a diagram of a data structure to be used in conjunction with the 3VPU, according to an embodiment of the invention.

FIG. 5 is a diagram of a data structure to be used in conjunction with the 3VPU, according to an embodiment of the invention. As shown in FIG. 5, the data structure is a voxel (or volumetric pixel), which groups points in physical space in a logical manner. The techniques described herein subdivide physical space 502 (shown on the left-hand side of FIG. 5, e.g., 1.5 m×1.5 m×1.5 m) into a voxel grid 504 with a certain number of voxels per axis (e.g., 4 voxels per axis). The relationship between the physical space 502 and voxel grid 504 is shown in FIG. 5. Use of a voxel 504 as data set input to the 3VPU Cores 208a-208c allows for separation of the data set to a reasonable size for each 3VPU Core. The voxel separation is typically implemented in the CPU, particularly when performing the initial voxel separation. In some embodiments, however, the voxel separation can be performed in the 3VPU.

This approach is especially critical in allowing parallelization of processing when used with 3VPU. Each voxel can be sent to a single 3VPU Core which independently and simultaneously processes the entire data set in parallel. Thus, using the voxel, depending on the number of 3VPU Cores available and the application requirements, parallel processing can be done in the 3VPU. For example, if there are 4 voxels and 4 3VPU Cores, because one 3VPU Core can process one voxel data set, the total data set is processed 4 times faster than with a single processing core.

The advantages provided by the 3VPU and the voxel data set versus the traditional usage of a CPU and GPU include the following:

- Even with a multi-core CPU (e.g., four-core), 3D processing can be only be parallelized by a factor of 8 versus 64 using the 3VPU and voxel techniques described above. Therefore, the 3VPU approach is orders of magnitude faster than traditional CPU techniques.
- Although typical GPUs have a large number of parallelized processing units, the GPUs are not optimized for 3D processing. For example, higher-end GPUs have a lot of memory but, as explained above, the power-to-cost ratio makes implementing these higher-end GPUs prohibitive. Lower-end GPUs may be used, but have a limited amount of memory. Therefore, the GPUs require several times more processing cores to perform the same function as a 3VPU with fewer 3VPU Cores. The additional cores in typical GPUs equate to added cost and higher power consumption. Further, the memory accessible for each GPU core is limited—which means a large amount of inefficient data transfer between GPU and CPU RAM.

The iterative closest point (ICP) algorithm commonly used in real-time to align two 3D free-form point clouds. Essentially, the ICP algorithm follows these steps: find nearest neighbors between two point clouds, calculate a cross-covariance matrix to estimate a transformation matrix, transform points with the estimated matrix and iterate the process. These steps will be described in greater detail below.

Figure 6:
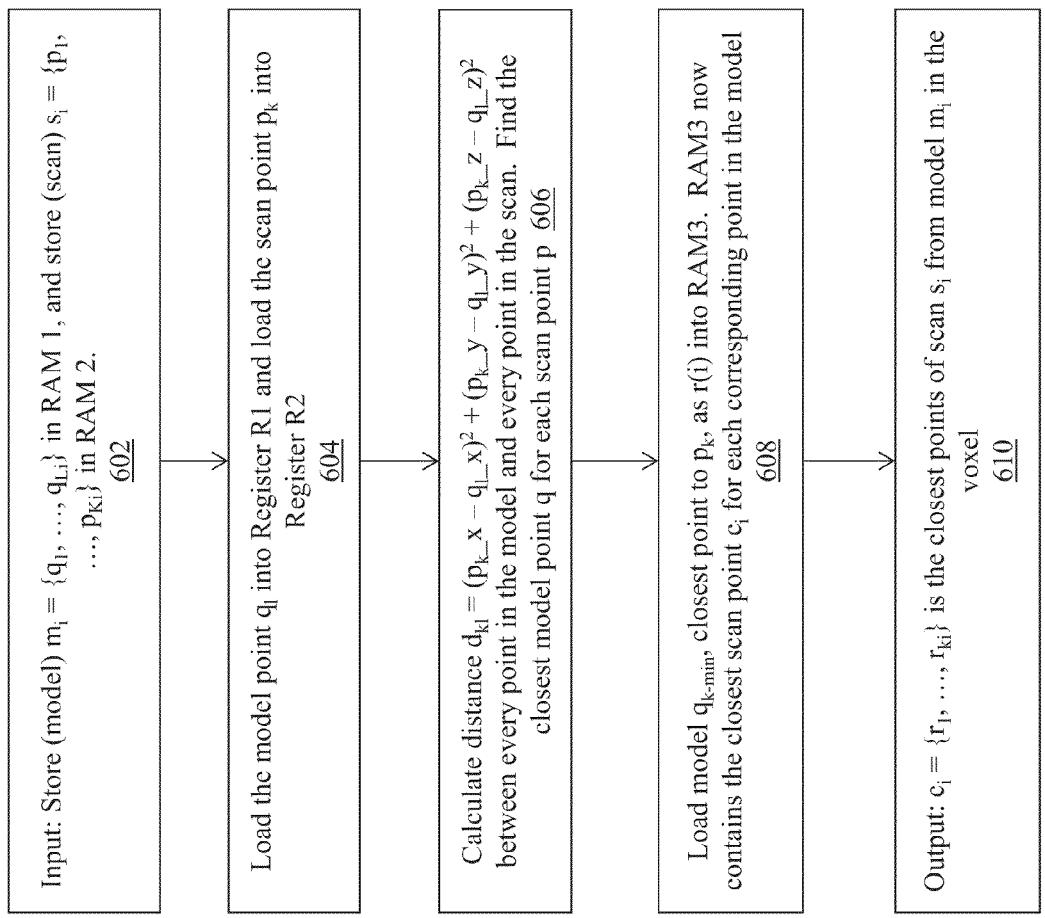
FIG. 6 is a flow diagram of a method for processing a nearest neighbor implementation of an iterative closest point (ICP) algorithm using the 3VPU architecture, according to an embodiment of the invention.

FIG. 6 is a flow diagram of a method 600 for processing a nearest neighbor implementation of an ICP algorithm using the 3VPU architecture, according to an embodiment of the invention. The ICP algorithm is a commonly-used computer vision algorithm that can be used in registration, object recognition, and feature detection. It should be appreciated that other computer vision and 3D processing algorithms can be used with the 3VPU without departing from the scope of the invention. The nearest neighbor search function shown in FIG. 6 is one implementation and it should be appreciated that there are other embodiments of the ICP algorithm that can be used.

To set up the nearest neighbor search function, the entire scan and model dataset is separated into voxels, as described previously. Each voxel dataset for the model and the corresponding scan in the same physical space is then transferred to the same 3VPU Core for processing. Thus, the entire dataset can be processed in parallel if there are an equivalent number of 3VPU Cores as the number of voxels to be processed.

As shown in FIG. 6, the input to the nearest neighbor search function is stored in the 3VPU Core 208a as follows: the 3VPU Core 208a stores (602) the model 3D point cloud $m_i$ consisting of points $\{q_1, \ldots, q_{Li}\}$ (602) in RAM 1 302a and the 3VPU Core 208a stores (602) the scanned 3D point cloud $s_i$ consisting of points $\{p_1, \ldots, p_{Ki}\}$ in RAM 2 302b. Therefore, there are L number of points in the model 3D point cloud and K number of points in the scanned 3D point cloud.

The 3VPU Core 208a loads (604) point $q_1$ (e.g., the x, y, and z values) from the model 3D point cloud into Register R1 308a and the 3VPU Core 208a loads (604) point $P_k$ into Register R2 308b. For example, point $q_1$ can be represented as values q_x, q_y, and q_z in Register R1, and point $P_k$ can be represented as values p_x, p_y, and p_z.

The 3VPU calculates (606) the distance between every point in the model and every point in the scan. In this example, the Add/Subtract/Multiply layer 402 of the ALU Processor 310 subtracts point $p_k$ from point $q_1$ by:

a) subtracting p_x from q_x and storing the result in section X3 of Register R3 308c;

b) subtracting p_y from q_y and storing the result in section Y3 of Register R3 308c;

c) subtracting p_z from q_z and storing the result in section Z3 of Register R3 308c;

The Add/Subtract/Multiply layer 402 of the ALU Processor 310 multiplies the values in Register R3 308c by:

e) multiplying the value (q_x-p_x) stored in section X3 by itself;

f) multiplying the value (q_y-p_y) stored in section Y3 by itself; and g) multiplying the value (q_z-p_z) stored in section Z3 by itself.

The Summation layer 404 of the ALU Processor 310 adds up the values in Sections X3, Y3 and Z3 of Register R3 308c to produce the distance between point $q_1$ and $p_k$, and stores the distance in section Z3.

The 3VPU Core 208a then compares the value stored in section Z3 to the previous lowest value stored in another Register (if available) or stored in a known RAM location. If the new Z3 (distance) is less than the previous smallest distance, the 3VPU Core 208a loads (608) the model $q_{k\text{-}min}$ closest point into RAM3 302a, as r(i). When all the points are processed, RAM3 now contains the closest model point $c_i$ for each corresponding scan point. Hence, when all the scan points are thus processed and the closest model point to each scan point is found and stored in RAM3 as $c_i=(r_1, \ldots, r_{ki})$ for the voxel (610), the 3VPU Core 208a moves on to the next step of finding the cross-covariance matrix.

The cross-covariance function is another critical function within the ICP algorithm that is very processing intensive and benefits from the 3VPU Core architecture described herein.

The cross-covariance function is also another example of implementing a completely different function using the 3VPU Core simply by changing the instruction code but using the same hardware implementation.

The 3VPU calculates the cross-covariance matrix and mean vector of the scan points $S=\{s_1, \ldots, s_N\}$ and the closest model points $C=\{c_1, \ldots, c_N\}$ using the ALU 306. For each voxel, a cross-covariance matrix is found between the scan S and the closest model points C. This calculation requires a complex matrix-type computation as follows:

Cov (S,C)=covsc1+ . . . +covscN;
Sum(S)=sums1+ . . . +sumsN;
Sum(C)=sumc1+ . . . +sumcN;
Let number of points in S=NumS;
Mean vector of S and C are MuS=SumS/NumS and MuC=SumC/NumS;
Final cross-covariance matrix is CovSC=CovSC/NumS−MuS*MuC.

Thus, each voxel is processed independently and then added together. Within a single voxel, the 3VPU Core 208*a* calculates cross-variance of $s_i$ and $c_i$ and summation vector of $s_i$ and $c_i$ using the ALU 306 as follows:

1) For k from 1 to $K_j$, load $p_k$ and $r_k$ into Registers R1 308*a* and R2 308*b*, e.g., $p_k=\{p_{k\_x}, p_{k\_y}, p_{k\_z}\}$ and $r_k=\{r_{k\_x}, r_{k\_y}, r_{k\_z}\}$.

2) Calculate the cross-covariance matrix $covsc_i=covsc_i+[p_{k\_x}, p_{k\_y}, p_{k\_z}]T*[r_{k\_x}, r_{k\_y}, r_{k\_z}]$ and summation vectors $sums_i=sums_i+[p_{k\_x}, p_{k\_y}, p_{k\_z}]$, $sumc_i=sumc_i+[r_{k\_x}, r_{k\_y}, r_{k\_z}]$ using the ALU 306.

Also, cross-covariance requires cross multiplication of each of the (x, y, z) values, e.g., x1 to x2, x1 to y2, x1 to z2, and so forth, for all combinations. The 3VPU takes advantage of the Shift function 406 in Registers R 308*a* and R2 308*b* that can exchange x, y, z values within a register. As mentioned above, the Shift function 406 is important for an efficient matrix operation since the entire exchange is done within a register (e.g., Register 308*a*) and in parallel to other operations within the ALU 306.

The following is an example of the cross-covariance calculation:

Function: covxx=X1*X2, covxy=X1*Y2, covxz=X1*Z2, covyx=Y*X2, covyy=Y1*Y2, covyz=Y1*Z2, covzx=Z1*X2, covzy=Z1*Y2, covzz=Z1*Z2

1) Load Register R1 308*a* (X1,Y1,Z1) with the values of a scan point (p_x, p_y, p_z) from RAM1 302*a*;

2) Load Register R2 308*b* (X2, Y2, Z2) with the values of the closest point r(i) (r_x, r_y, r_z) from RAM3 302*c* (as previously calculated using the ICP algorithm in FIG. 6);

3) Multiply the values in the X, Y, and Z sections of Register R1 and Register R2 and store the results in the X, Y, and Z sections of Register R3, e.g., X3=(covxx), Y3 (covyy), Z3=(covzz);

4) Save the values in Register R3 into RAM4 (to be loaded back later for summation);

5) Perform the Shift function 406 on Register R2 308*b*, e.g., SHIFT=>R2 (X2, Y2, Z2)=(r_y, r_z, r_x);

6) Multiply: X3=(covxy), Y3=(covyz), Z3=(covzx);

7) Save the results of the multiplication into RAM4;

8) Perform the Shift function 406 on Register R2 308*b*, e.g., SHIFT=>R2 (r_z, r_x, r_y);

9) Multiply: X3=(covzx), Y3=(covyx), Z3=(covzy);

10) Save the results of the multiplication into RAM4.

Therefore, with these simple steps, the cross-covariance function is computed in just a few clock cycles. As a result, covxx, covxy, covxz, covyz, covyy, covyz, covzx, covzy, and covzz can be computed for all points and summed together to form a cross-covariance matrix. Such summation is done in the 3VPU Core by loading the above values from RAM4 back into the Registers and using the add function of the Add/Subtract/Multiply layer 402. The cross-covariance matrix is found for the entire scan S and C (closest model points). The above utilization of the 3VPU to calculate a cross-covariance matrix offers several advantages over the traditional CPU/GPU model. First, the "Shift"→"Multiply"→"Summation" process flow allows the 3VPU to efficiently perform matrix-based 3D processing functions. In contrast, a CPU and most GPUs do not generally have this type of structure and thus take many more clock cycles to perform the same function.

Next, in order to complete a single iteration of the ICP algorithm, the 3VPU determines a rotation matrix and translation vector for the scan S. This step finds the amount of shift and rotation needed to match the scan S to the model. Then, the 3VPU updates the scan S to a new position that is a closer match to the model by applying the rotational matrix and translation vector. The 3VPU performs these steps until the scan and the model converge, i.e., the ICP error is minimal. At this point, the scan is registered to the model.

As mentioned previously, the 3VPU can include certain commonly-used 3D and/or vision processing computational equations as part of the hardware of the chip on which the 3VPU is implemented. In some embodiments, the following functions are hard-coded into the silicon chip of the 3VPU to enable the software to execute the functions:

K-Means Clustering

Given a set S of D-dimensional points, and an integer K, the goal of the k-means clustering is to partition the points into K subsets (Ci (i=1,K)) so that the following error function is minimized:

$$E = \sum_{i=1}^{K} \sum_{x \in C_i} (x - center_i)^2$$

where $$center_i = \sum_{x \in C_i} x/|C_i|$$

Hausdorff Distance

For point sets, the normal distance functions have to be slightly modified, and the Hausdorff function is a suitable representation. Given a complete metric space (X, d), we can define the Hausdorff space H, where H(X) represents the space whose points are the compact subsets of X, excluding the empty set. We can now define h, the Hausdorff metric that defines the distance between the sets A and B∈H(X), by $$h(A,B)=\max\{d(A,B),d(B,A)\}$$

where $$h(A,B)=\max\{d(A,B),d(B,A)\}$$

and $$d(x,B)=\min\{d(x,y):y \in B\}$$

d being the standard distance function.

The set of standard Euclidean distance functions are commonly used. These are defined as:

$$d^p(x,y)=(|x^p-y^p|)^{1/p}$$

Absolute error ($d^1$) and mean squared error ($d^2$) are the most widely used parameters. We now have a measure that indicates, in a general sense, how similar two images are.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g. magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A 3D vision processor device for processing 3D vision algorithms, the device comprising:
   one or more 3D vision processing cores, each 3D vision processing core comprising:
      one or more memory blocks for storing location values associated with 3D point cloud images;
      an arithmetic logic unit coupled to the one or more memory blocks, the arithmetic logic unit comprising:
         a plurality of memory registers for temporarily storing location values associated with a point in a 3D point cloud image;
         a processing unit coupled to the plurality of memory registers for performing arithmetic operations on the location values stored in the memory registers, the arithmetic operations used for 3D vision processing algorithms; and
      a communication link for transferring data between the arithmetic logic unit and the memory blocks.

2. The device of claim 1, wherein the location values associated with 3D point cloud images are x-axis, y-axis and z-axis values.

3. The device of claim 1, wherein each of the plurality of memory registers is independently coupled to the processing unit and independently coupled to the one or more memory blocks.

4. The device of claim 3, wherein each of the plurality of memory registers retrieves location values from the one or more memory blocks in a single bus cycle.

5. The device of claim 1, wherein each of the plurality of memory registers is partitioned into three sections, and each of the three sections is associated with one of the location values.

6. The device of claim 1, wherein the processing unit of the arithmetic logic unit is comprised of two arithmetic processing layers.

7. The device of claim 6, wherein the first arithmetic processing layer performs the arithmetic operations of addition, subtraction, multiplication, and division, and the second arithmetic processing layer performs the arithmetic operation of summation.

8. The device of claim 7, wherein the first arithmetic processing layer comprises a plurality of arithmetic logic modules, each coupled to one or more of the plurality of memory registers.

9. The device of claim 1, further comprising an imaging device coupled to the 3D vision processor device, the imaging device capturing and transmitting images to the 3D vision processor device for analysis.

10. The device of claim 1, wherein the 3D vision processor device is in a mobile or embedded computing device.

11. The device of claim 1, wherein the location values associated with 3D point cloud images stored in the one or more memory blocks represent one or more voxels of the 3D point cloud images.

12. The device of claim 1, wherein the processing unit of the arithmetic logic unit accesses two or more of the memory registers simultaneously and performs arithmetic operations on the location values stored in the memory registers in parallel.

13. The device of claim 1, wherein the one or more memory registers include a shift command operable to exchange location values within the memory register.

14. The device of claim 1, wherein the one or more 3D vision processing cores receive 3D point cloud data from an external source independently of the other 3D vision processing cores and convert the received 3D point cloud data into one or more voxels for storage in the one or more memory blocks and processing by the arithmetic logic unit.

15. The device of claim 1, wherein the one or more 3D vision processing cores are coupled together via a communication link and the one or more 3D vision processing cores exchange 3D point cloud data.

16. The device of claim 1, wherein one or more vision processing algorithms are programmed into the 3D vision processor device.

17. The device of claim 1, further comprising an interface to software-based vision processing algorithms, wherein the device accesses the software-based vision processing algorithms to alter the arithmetic operations performed by the one or more 3D vision processing cores.

18. An arithmetic logic processor for processing 3D vision algorithms, the arithmetic logic processor comprising:
   a plurality of memory registers for temporarily storing location values associated with a point in a 3D point cloud image; and
   a processing unit coupled to each of the plurality of memory registers via a separate bus, the processing unit for performing 3D vision processing arithmetic operations on the location values stored in the memory registers,
   wherein the processing unit comprises a plurality of arithmetic operation layers.

19. The arithmetic logic processor of claim 18, wherein a first arithmetic processing layer performs the arithmetic operations of addition, subtraction, multiplication, and division, and a second arithmetic processing layer performs the arithmetic operation of summation.

20. The arithmetic logic processor of claim 18, wherein the processing unit accesses two or more of the memory registers simultaneously and performs arithmetic operations on the location values stored in the memory registers in parallel.

21. A computerized method for processing 3D vision algorithms, the method comprising:
   receiving, from an imaging device, 3D point cloud data representative of a physical object;
   storing, in one or more memory blocks of a 3D vision processing core, location values associated with points in the 3D point cloud data;
   retrieving, by an arithmetic logic unit coupled to the one or more memory blocks, location values associated with a point in the 3D point cloud data and temporarily storing the location values in a plurality of memory registers;
   executing, by a processing unit coupled to the plurality of memory registers, one or more arithmetic operations on the location values stored in the memory registers, the arithmetic operations used for 3D vision processing algorithms; and
   transmitting, by the processing unit, a result of the one or more arithmetic operations to a central processing unit.

* * * * *